United States Patent
Yeo et al.

(10) Patent No.: US 8,059,531 B2
(45) Date of Patent: Nov. 15, 2011

(54) PACKET SCHEDULING METHOD FOR REAL-TIME TRAFFIC TRANSMISSION IN MOBILE TELECOMMUNICATION SYSTEM

(75) Inventors: Kun-Min Yeo, Daejeon (KR); Byung-Han Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 687 days.

(21) Appl. No.: 11/721,771

(22) PCT Filed: Oct. 12, 2005

(86) PCT No.: PCT/KR2005/003395
§ 371 (c)(1),
(2), (4) Date: Jul. 9, 2008

(87) PCT Pub. No.: WO2006/065021
PCT Pub. Date: Jun. 22, 2006

(65) Prior Publication Data
US 2010/0008305 A1    Jan. 14, 2010

(30) Foreign Application Priority Data
Dec. 14, 2004  (KR) .................. 10-2004-0105828

(51) Int. Cl.
*H04L 12/26*    (2006.01)
(52) U.S. Cl. ........................................... 370/229
(58) Field of Classification Search .................. None
See application file for complete search history.

(56) References Cited

U.S. PATENT DOCUMENTS

| | | |
|---|---|---|
| 5,859,835 A | 1/1999 | Varma et al. |
| 6,804,738 B2 | 10/2004 | Weber |
| 6,807,426 B2 | 10/2004 | Pankaj |
| 2002/0197999 A1 | 12/2002 | Wu et al. |
| 2003/0135632 A1* | 7/2003 | Vrzic et al. .................. 709/231 |
| 2003/0152083 A1 | 8/2003 | Nagata et al. |

OTHER PUBLICATIONS

International Search Report of the International Published Application No. PCT/KR2005/003395 (mailed Jan. 25, 2006).
Matthew Andrews et al., "Providing Quality of Service over a Shared Wireless Link", IEEE Communications Magazine, pp. 150-154, Feb. 2001.

* cited by examiner

*Primary Examiner* — Kevin C Harper
(74) *Attorney, Agent, or Firm* — Staas & Halsey LLP

(57) ABSTRACT

Provided is a method of scheduling packets in a mobile telecommunication. The method includes the steps of: a) calculating a normalized standard data unit (SDU) drop rate based on the number of SDUs that will be dropped if the SDUs will not transmitted in a next slot, the number of SDUs dropped unit a current slot, the number of SDUs transmitted until the current slot and a maximum SDU drop rate allowed at each session; b) selecting sessions to transmit in a next slot and deciding a transmission amount of each session at a current slot based on the normalized SDU drop rate; and c) performing the steps a) and b) until all basic units (BU) in one slot are used.

10 Claims, 5 Drawing Sheets

PACKET SCHEDULING METHOD FOR REAL-TIME TRAFFIC TRANSMISSION IN MOBILE TELECOMMUNICATION SYSTEM

CROSS REFERENCE TO RELATED APPLICATIONS

This application claims the benefit under U.S.C. Section 371, of PCT International Publication No. PCT/KR2005/003395, filed Oct. 12, 2005 and Korean Application No. 10-2004-0105828 filed Dec. 14, 2004, the contents of both which are incorporated herein by reference.

TECHNICAL FIELD

The present invention relates to a packet scheduling method for real-time traffic transmission in mobile telecommunication system; and more particularly, to a packet scheduling method for guaranteeing delay requirements for transmitting a real-time traffic and a service data unit (SDU) drop rate by effectively reflecting a wireless channel state in a packet based mobile telecommunication system.

BACKGROUND ART

Recently, specifications for wireless Internet service standard were introduced by the international standardization organizations such as BRAN HIPERLAN/2, IEEE 802.11a and IEEE 80216. Accordingly, related systems for wireless Internet service have been actively developed. There are also many studies in actively progress to develop a packet transmission technology to prior occupy a technology for the fourth generation of packet based mobile telecommunication system.

In the packet transmission technology, a packet scheduling scheme is introduced to maximize the efficiency of wireless resource for transmitting packets. The packet scheduling scheme has been specialized as a field of sharing wireless link and is used as a method of improve the capacity of system compared to a conventional line mode.

The real-time traffic must obey delay requirement conditions due to its characteristics and a predetermined level of packet loss rate must be guaranteed. A quality of service (QoS) is suggestively guaranteed when the real-time traffic is transmitted if a call is accepted through a call connection control in a typical line mode including a code division multiple access (CDMA) dedicated channel. Therefore, a dedicated scheduler is essential to satisfy QoS such as delay in the packet mode. Since the wireless environment is dynamically changed in a time domain differently from the wired environment, such a characteristic must be reflected into the scheduling algorithm.

A packet scheduler for real-time traffic services session having a longer delay in a buffer first of all. In this case, there is large possibility that the scheduler cannot satisfy the absolute delay requirement conditions although the scheduler minimizes the delay. When the scheduler selects a session to be transmitted from a current slot to a next slot, the scheduler has a difficulty to reflect a packet lost rate caused by the delay because the scheduler reflects only a delay state of a head of line (HOL) packet which arrives at the buffer at first.

In order to describe a conventional scheduler, there are assumptions as follows. There are two sessions A and B. A HOL delay of the session A is 50 ms and a HOL delay of the session B is 100 ms. And, same number of packets for the sessions A and B are stored in each buffer. Furthermore, the number of packets of the session A are not be deleted is 10 if those are not transmitted in the next slot, and the number of packets of the session B are not be deleted is 1 if those are not transmitted in the next slot.

Under such assumptions, if the packets are scheduled to transmit by only considering the simple delay and the number of packets in the buffer, the session B will be selected. If the wireless channel conditions of two sessions are identical and a current slot can transmit five packets, the session A may transmit four packets which are not required to transmit at the next slot. Then, the session B may loss a chance to sent 10 packets to transmit with the next slot. If the session A is selected, the five packets will be transmitted and five packets will be deleted. Therefore, it is better in the view of QoS to select the session A than to select the session B.

DISCLOSURE

Technical Problem

It is, therefore, an object of the present invention to provide a packet scheduling method for reducing a packet loss rate caused and satisfying requirements of transmitting real-time traffic by reflecting a future packet drop rate to a current scheduling time.

Technical Solution

In accordance with one aspect of the present invention, there is provided a method for scheduling a packet in a packet based mobile telecommunication system, including the steps of: a) calculating a normalized standard data unit (SDU) drop rate based on the number of SDUs that will be dropped if the SDUs will not transmitted in a next slot, the number of SDUs dropped until a current slot, the number of SDUs transmitted until the current slot and a maximum SDU drop rate allowed at each session; b) selecting sessions to transmit in a next slot and deciding a transmission amount of each session at a current slot based on the normalized SDU drop rate; and c) performing the steps a) and b) until all basic units (BU) in one slot are used up.

The present invention related to a packet scheduling method for transmitting a real-time traffic in a mobile telecommunication system. It is object of the present invention to provide an effective wireless resource management and a packet transmission mechanism through combining a delay requirement to a packet loss rate.

Therefore, a normalized SDU drop rate is calculated for providing fairness to each session and a session selection and a transmission amount are determined by reflecting a wireless channel condition based on the calculated SDU drop rate in the present invention.

That is, the normalized packet loss rate is adopted by reflecting channel states of each session, current packet loss states, and future packet loss states at each transmitting point. Since the maximum packet loss rate set to each session is different, the normalized packet loss rate is reflected to provide fairness to each session. Herein, a basic unit of transmission is expressed as a combination of wireless resources of a time region and a frequency region, and a basic unit of transmission in a unit slot is allocated to each session.

Therefore, the packet loss rate is reduced by reflecting the future packet drop rate to the current scheduling time, and the requirements for transmitting real-time traffic are satisfied according to the present invention.

Advantageous Effects

A method of scheduling packets according to the present invention reduces a packet loss rate caused by a delay by reflecting the future packet drop rate to the current scheduling time. Therefore, the requirements for transmitting real-time traffic can be satisfied according to the present invention.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter.

Figure 1:
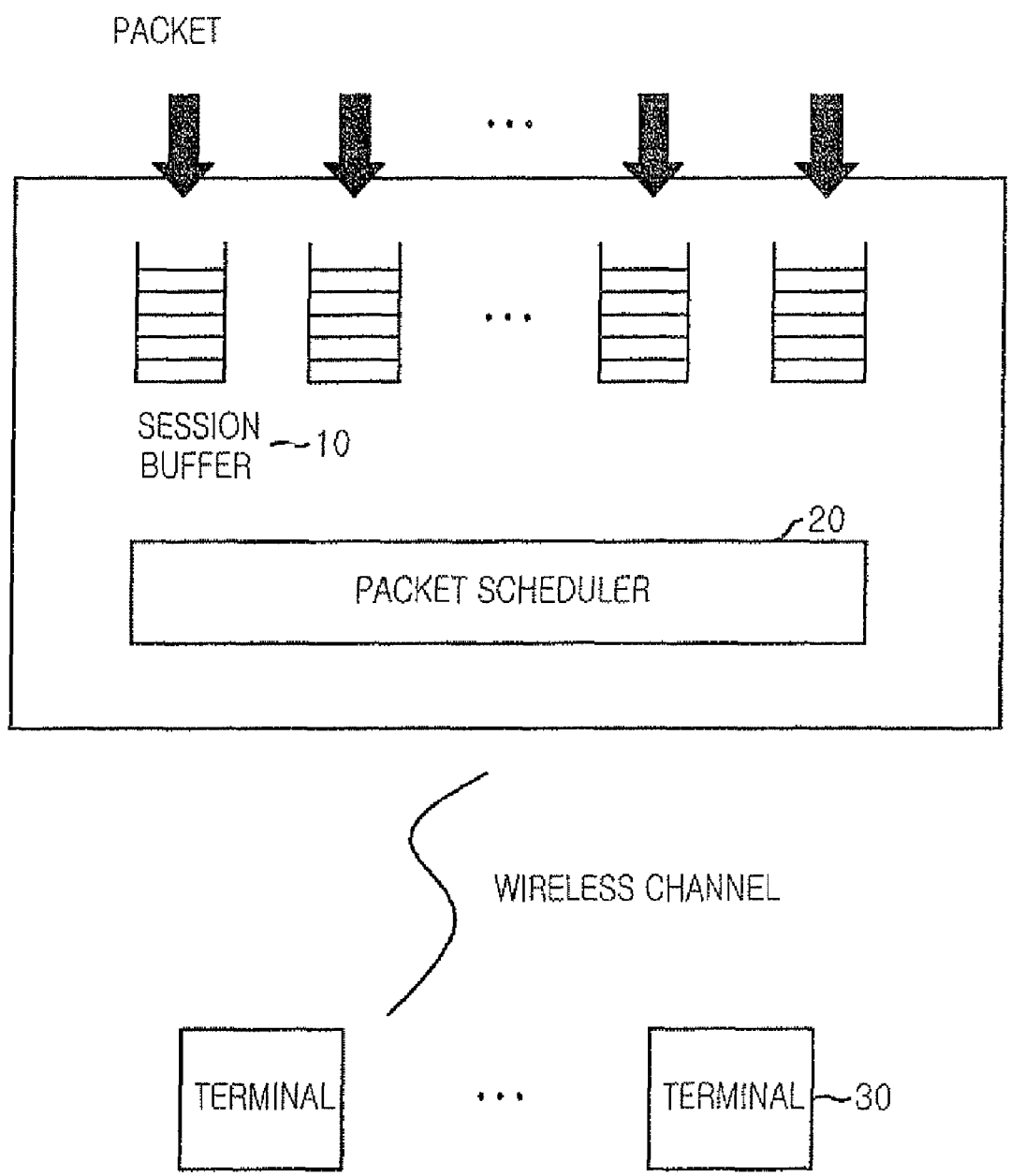
FIG. 1 is a block diagram illustrating a packet scheduling method in a mobile telecommunication system in accordance with a preferred embodiment of the present invention.

FIG. 1 is a block diagram illustrating a packet scheduling method for a mobile telecommunication system in accordance with a preferred embodiment of the present invention.

As shown in FIG. 1, a delay time of each service data unit (SDU) is updated when a SDU arrives at a buffer 10 connected to each session.

A scheduler 20 is operated at each slot. The scheduler 20 selects sessions to transmit in a next slot and determines a transmission amount thereof at a current slot. The schedule 20 uses a normalized SDU drop rate as a reference to select the sessions. The normalized SDU drop rate is calculated based on the number of SDUs dropped if those are not transmitted in the next slot, the number of SDUs dropped at the current slot, the total number of SDUs transmitted until the current slot and the maximum SDU drop rate allowable to each session.

The scheduler 20 transmits the selected SDUs to a terminal 30 by loading the selected SDUs in a basic unit, and the scheduler 20 repeatedly transmits the SDUs until all BUs allowed to transmit in a single slot are transmitted. If there is no target session in the next slot, or if BUs are remained after allocating the BUs to the target sessions to transmit in the next slot, the scheduler 20 allocates BUs to SDUs that will be dropped if they are not be transmitted in the slot following the next slot. Such an operation is repeatedly performed until all BUs allowed to transmit in a single slot are allocated.

Figure 2:
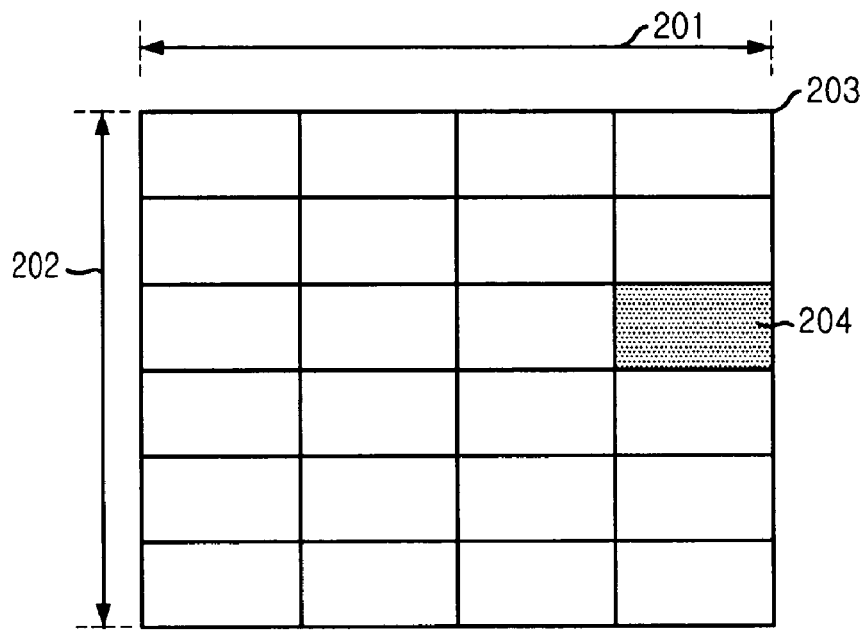
FIG. 2 shows a basic transmission unit expressed by a time and a frequency domain of a mobile telecommunication system in accordance with a preferred embodiment of the present invention.

FIG. 2 shows a basic transmission unit expressed by a time and a frequency domain of a mobile telecommunication system in accordance with a preferred embodiment of the present invention.

In FIG. 2, a numeral reference 201 denotes a slot which is a wireless resource on a time domain, and a numeral reference 202 denotes a wireless resource on a frequency domain.

A region formed of the wireless resources 201 and 202 denotes a transmission region 203 per each slot. The scheduler selects the sessions to transmit and determines a transmission amount (byte unit) at every slot to fill the transmission region 203 per each slot.

Also, a numeral reference 204 denotes a basic transmission unit that is defined as a minimum unit of time and the number of frequencies to transmit data with the same adaptive modulation and coding (AMC) attribute.

Herein, the AMC attribute is an index representing a wireless channel state. For example, the wireless channel between the base station and a predetermined terminal has good AMC attribute if the wireless channel state thereof is fair. That is, the amount of data to transmit in a basic transmission unit increases in proportional to the AMC attribute.

Figure 3:
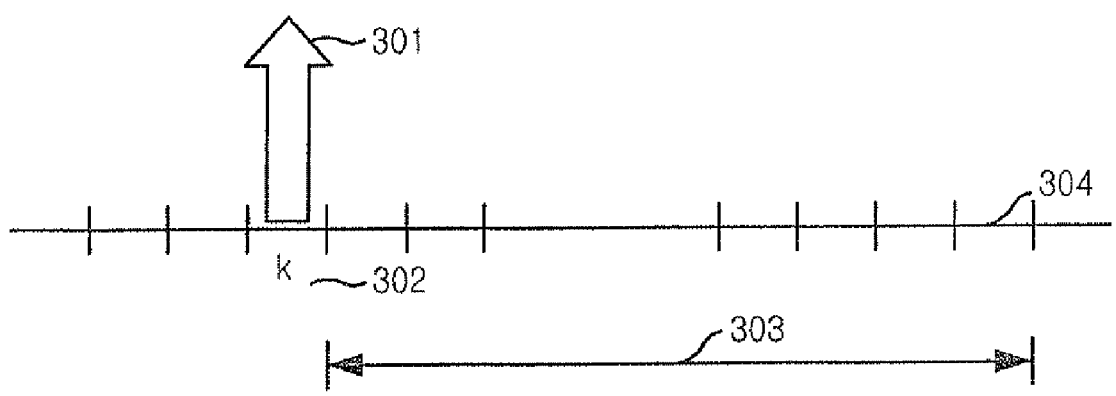
FIG. 3 is a view for describing calculation of further SDU error rate for selection a session to transmit and an capacity of SDU in accordance with a preferred embodiment of the present invention.

FIG. 3 is a view for describing calculation of a future SDU error rate for selecting a session to transmit and a capacity of SDU in accordance with a preferred embodiment of the present invention.

In FIG. 3, a numeral reference 303 denotes an index for calculating a SDU error rate to be applied to a corresponding session, and it is expressed as H(i). That is, H(i)=4, a SDU delay state from a current slot k 302 to a slot 304 after H(i) is reflected to calculate a normalized SDU error rate for a session i. Therefore, if a session i is selected at a current slot, the transmission amount is calculated as a sum of SDUs that will not satisfy the transmission delay requirement condition if those are not transmitted unit a slot after H(i). It will be described in more detail with reference to FIG. 4.

Figure 4:
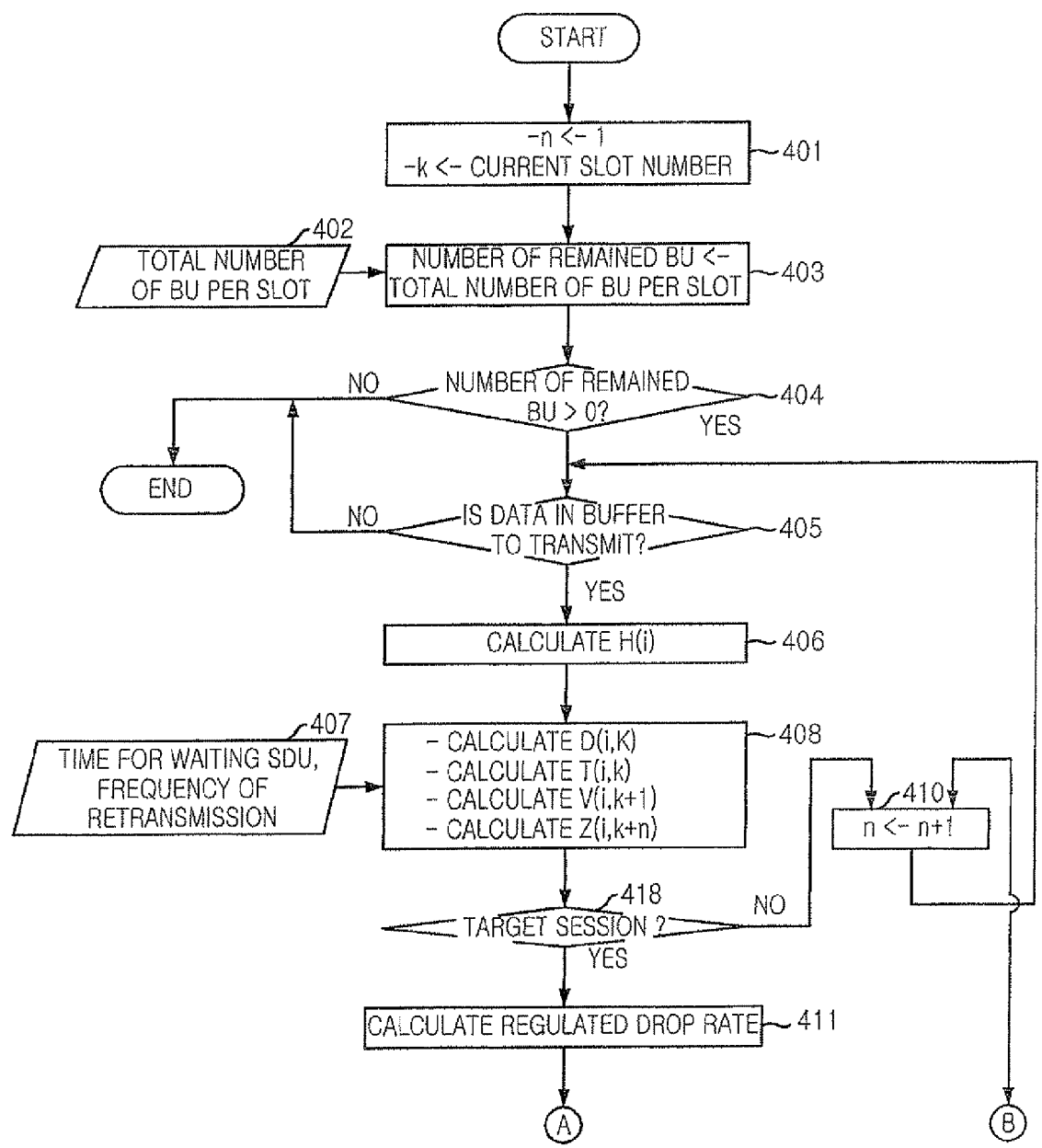
FIG. 4 and FIG. 5 are flowcharts of a packet scheduling method for transmitting a real-time traffic in a mobile telecommunication system in accordance with a preferred embodiment of the present invention.
Figure 5:
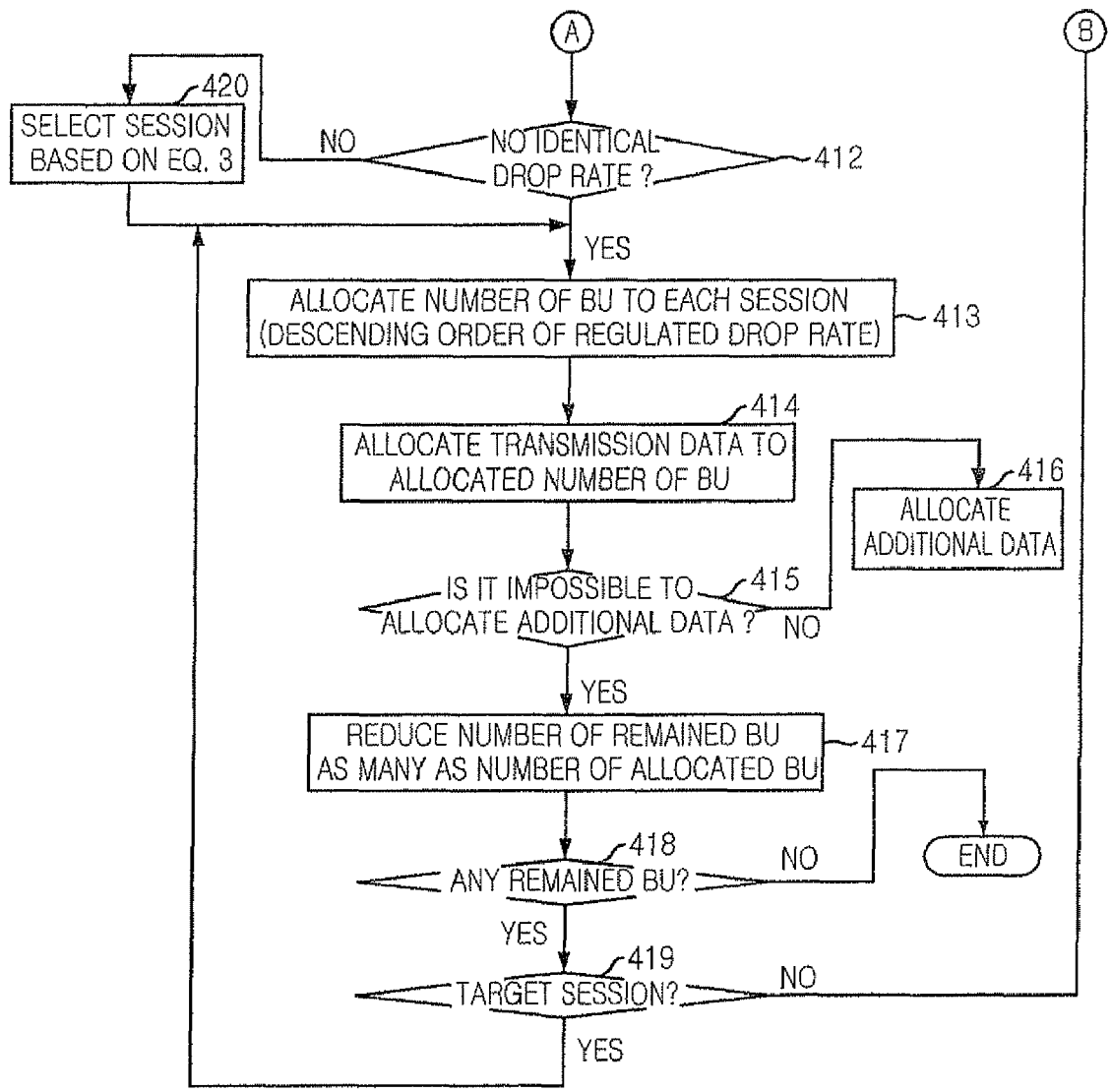

FIG. 4 and FIG. 5 are flowcharts of a packet scheduling method for transmitting a real-time traffic in a mobile telecommunication system in accordance with a preferred embodiment of the present invention.

At first, a scheduling operation is performed at a current slot k to transmit data in a next slot k+1 at step 401.

Then, it receives a total number of basic units that can be transmitted at each slot at step 402 and the received total number of basic units is set as the number of remained basic units, initially at step 403.

If there are basic units to be allocated at step 404, it determines whether there is data remained in a buffer at step 405.

If there is no basic unit to be allocated at step 404, or if there is no data in the buffer at step 405, the method of scheduling ends.

If there is data in the buffer at step 405, a total delay time (SDU waiting time) until the current slot and the number of retransmissions for each SDU of each session are received at step 407. Then, it calculates the number of SDUs dropped until the slot k ([D(i,k)]) for each session i at step 408. Herein, the transmission delay and the number of retransmission may exceed a threshold value or the maximum number of retransmissions when the SDU is dropped. Also, it calculates the number of SDUs to be transmitted unit the slot k [T(i,k)] for each session I at step 408. Furthermore, it calculates the number of SDUs dropped if the SDUs are not transmitted in the next slot (k+1) [V(i,k+1)] for each slot i based on the inputted delay time information at step 408. Moreover, it calculates an index set of sessions having SDU dropped if they are not transmitted in the slot (k+1) [Z(k+1)={i: V(i,k+1)>0}] at step 408.

Herein, the index H(i) for the SDU error rate is calculated at the step 406. Then, it determines whether there is a target session that does not satisfy the delay requirement condition from Z(k+1) information at step 409.

If there is no target session, it determines whether there is data in a buffer to transmit for calculating an index set of session having SDUs that will be dropped if the SDUs are not be transmitted at a slot (k+2) at step 405.

If there is the target session at the step 409, the normalized SDU drop rate [NDR(i,k)] is calculated by following Eq. 1 at step 411.

$$NDR(i, k) = \left(\frac{D(i, k) + V(i, k + H(i))}{T(i, k)}\right) \times \left(\frac{1}{R(i)}\right) \quad \text{Eq. 1}$$

In Eq. 1, D(i,k) denotes the number of SDUs dropped until a slot k of a session i, and T(i,k) is the number of SDUs to be transmitted until a slot k of a session i. R(i) denotes an allowed maximum SDU drop rate of a session I, and V(i,k) is the number of SDUs of a session I that will be dropped if they will not transmitted in a slot k. H(i) denotes an index for calculating SDU error rate of a session i.

The scheduling allocates BUs as many as B(i,k) to sessions according to an order of sessions having a larger normalized SDU drop rate NDR(i,k) at step 413. Herein, B(i,k) is the number of BUs to transmit the SDUs that will be dropped if they will not be transmitted at a slot (k+1). It will be calculated by following Eq. 2.

$$B(i, k) = \left\lceil \frac{V(i, k)}{A(i, j, k)} \right\rceil \quad \text{Eq. 2}$$

In Eq. 2, A(i,j,k) denotes the maximum number of bytes to be transmitted with an AMC option j at a slot (k+1), and $\lceil x \rceil$ denotes a minimum integer larger than x.

Then, V(i,k+1) bytes of transmission data are allocated to B(i,k) of BUs at step 414.

After initially allocating at step 414, the scheduling checks whether it is possible to allocate additional data to the allocated number of BUs at step 415. If V(i,k+1)=B(i,k)×A(i,j,k), there is no data to allocated. If V(i,k+1)<B(i,k)×A(i,j,k), it is possible that bytes as many as B(i,k)×A(i,j,k)−V(i,k+1) can be additionally allocated excepting V(i,k+1) of bytes at step 416.

If the data is additionally allocated, there must be SDU waiting in a transmission buffer.

After finishing the allocation of transmission data at step 414, the number of remained BUs is decreased as many as the number of BUs allocated at step 417.

After the allocation for predetermined session at steps 414 and 416, it checks where there is remained BUs or not at step 418.

If there is no BUs remained at step 418, the scheduling ends. If there is BUs remained and corresponding session exists at step 419, the step 413 is performed for allocating BUs as many as B(i,k) to sessions according to an order of having a larger normalized SDU drop rate NDR(i,k).

If there is Bus remained at step 418 but no corresponding session is detected at step 419, the step 405 is performed for checking whether there is data to be transmitted in a buffer to calculate an index set of a session having SDUs that will be dropped.

Meanwhile, if there is a value same to the normalized SDU drop rate [NDR(i,k)] which is calculated based on Eq. 1 at step 412, corresponding sessions are selected according to a descending order of values calculated by following Eq. 3 at step 420.

$$C(i) = \left(\frac{F(i, k) - F(i)}{F(\max) - F(\min)}\right) \times \left(\frac{W(i, k)}{T(i)}\right) \quad \text{Eq. 3}$$

In Eq. 3, W(i) denotes a head-of-line (HOD) transmission delay of a session I, and F(i,k) denotes the maximum number of bytes to be transmitted by the session I at slot k with a maximum AMC option. Also, F(i) denotes an average value for the maximum number of bytes to be transmitted with an AMC option used when the packet of session i is transmitted, and an average value from the time of transmitting the initial packet to the current slot. Also, F(max) denotes an amount of data to be transmitted with one basic unit (BU) under the highest AMC option, and F(min) denotes an amount of data to be transmitted with on basic unit (BU) under the lowest AMC option. Also, T(i) denotes a transmission delay limit value. That is, if one packet is not successfully transmitted within a time T(i) after the packet arrives at the buffer, the corresponding packet is deleted from the buffer. In FIG. 3, values of (F(i,k)F(i))/(F(max)−F(min)) and W(i,k)/T(i) are smaller than 1.

In Eq. 3, the index H(i) for SDU error rate is calculated by following Eq. 4.

$$H(i) = \max\left\{1, \left\lceil \frac{L(i)}{G(i) \times S} \right\rceil\right\} \quad \text{Eq. 4}$$

In Eq. 4, L(i) denotes the number of SDUs waiting in a buffer of a session i, and G(i) denotes an average SDU input rate of session i. S denotes the length of slot. If a unit of G(i) is bits/s, a unit of L(i) is the number of bits. If the unit of R(i) is bytes/s, the unit of L(i) is the number of bytes and the unit of s is second.

The above described method according to the present invention can be embodied as a program and stored on a non-transitory computer readable recording medium. The non-transitory computer readable recording medium is any data storage device that can store data which can be thereafter read by the computer system. The non-transitory computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the scope of the invention as defined in the following claims.

What is claimed is:

1. A method for scheduling a packet in a packet based mobile telecommunication system, the method performed by a packet scheduler, comprising:
    calculating a normallized standard data unit (SDU) drop rate based on the number of SDUs that will be dropped if the SDUs are not transmitted in a next slot, the number of SDUs dropped until a current slot, the number of SDUs transmitted until the current slot and a maximum SDU drop rate allowed at each session;
    selecting sessions to transmit in a next slot and deciding a transmission amount of each session at a current slot based on the normallized SDU drop rate; and
    performing the calculating and the selecting until all basic units (BU) in one slot are used up.

2. The method as recited in claim 1, wherein the perporming, if there is no target session in a next slot or if there are BUs remained after allocating for target sessions to transmit in the next slot, allocation is performed for SDUs that will be dropped if the SDUs are not be transmitted in the slot following the next slot.

3. The method as recited in claim 2, wherein the SDUs selected the selecting are transmitted by loading into the basic unit (BU), a basic unit of transmission is expressed as combination of wireless resources in a time and a frequency region, and a basic unit of transmission per a unit slot is allocated to each session.

4. The method as recited in claim 1, wherein in the calculating, a normalized packet loss rate reflecting a channel state of each session, a current packet loss state and a future packet loss state is calculated by $$NDR(i, k) = \left(\frac{D(i, k) + V(i, k + H(i))}{T(i, k)}\right) \times \left(\frac{1}{R(i)}\right), \quad \text{Eq. 1}$$

where D(i,k) denotes the number of SDUs dropped until a slot k of a session i, T(i,k) is the number of SDUs to be transmitted until a slot k of a session i, R(i) denotes an allowed maximum SDU drop rate of a session i, and V(i,k) is the number of SDUs of a session i that will be dropped if they will not transmitted in a slot k, and H(i) denotes an index for calculating SDU error rate of a session i.

5. The method as recited in claim 4, wherein the index H(i) for calculating the SDU error rate in the Eq. 1 is calculated by $$H(i) = \max\left\{1, \left\lceil\frac{L(i)}{G(i) \times S}\right\rceil\right\}, \quad \text{Eq. 2}$$

where L(i) denotes the number of SDUs waiting in a buffer of a session i, and G(i) denotes an average SDU input rate of session i. S denotes the length of slot, a unit of L(i) is the number of bits if a unit of G(i) is bits/s, the unit of L(i) is the number of bytes if the unit of R(i) is bytes/s, and the unit of s is a second.

6. The method as recited in claim 1, wherein the calculating includes:
scheduling to transmit data of a next slot (k+1) at a current slot k;
receiving a total number of BUs to be allocated to each slot and setting an initial number of remained BUs as the received number of BUs;
determining whether there is data to transmit in a buffer if there is BUs to allocate;
if there is data to transmit in a buffer, calculating the number of SDUs dropped until a slot k for each session i, which is [D(i,k)], the number of SDUs transmitted until a slot k for each session i, which is [T(i,k)], the number SDUs dropped if the SDUs are not be transmitted at a next slot (k+1) for each session i, which is [V(i,k+1)], and an index set [Z(k+1)={i: V(i,k+1)>0}] of a session having SDUs that will be dropped if the SDUs are not be transmitted at a next slot (k+1) for each session i by receiving a delay time (SDU waiting time) and a retransmission time until a current slot for each SDU of each session;
determining whether there is a target session that cannot satisfy a delay requirement based on the index set Z(k+1) information; and
calculating a normalized SDU drop rate [NDR(i,k)] by Eq. 1 if there is the target session.

7. The method as recited in claim 6, wherein in the performing, if there is no target session, performing to determine whether there is data in the buffer in order to calculate an index set of a session having SDUs that will be dropped if the SDUs are not be transmitted at a slot (k+2).

8. The method as recited in claim 7, wherein the scheduling includes:
allocating BUs in an order of sessions having greater normalized SDU drop rate (NDR(i,k)) as many as the number of BUs for transmitting SDUs that will be dropped if the SDUs will be transmitted at slot (k+1) which is [B(i,k)];
allocating V(i,k+1) bytes of transmission data to the allocated B(i,k) of BUs;
allocating bytes additionally by determining whether it is possible to additionally allocate to the allocated BUs; and
reducing the number of remained BUs as many as the allocated BUs.

9. The method as recited in claim 8, wherein the scheduling further includes the step of selecting a corresponding session in a descending order of values calculated by following Eq. 3 if there is a same value to the normalized SDU drop rate [NDR(i,k)], wherein $$C(i) = \left(\frac{F(i, k) - F(i)}{F(\max) - F(\min)}\right) \times \left(\frac{W(i, k)}{T(i)}\right), \quad \text{Eq. 3}$$

where W(i) denotes a head-of-line (HOD) transmission delay of a session i, F(i,k) denotes the maximum number of bytes to be transmitted by the session i at a slot k with a maximum AMC option, F(i) denotes an average value for the maximum number of bytes to be transmitted with an AMC option used when the packet of session i is transmitted (an average value from the time of transmitting the initial packet to the current slot), F(max) denotes an amount of data to be transmitted with one basic unit (BU) under the highest AMC option, F(min) denotes an amount of data to be transmitted with on basic unit (BU) under the lowest AMC option, T(i) denotes a transmission delay limit value, and if one packet is not successfully transmitted within a time T(i) after the packet arrives at the buffer, the corresponding packet is deleted from the buffer, and values of (F(i,k)F(i))/(F(max)-F(min)) and W(i,k)/T(i) are smaller than 1.

10. The method as recited in claim 8, wherein the performing includes:
determining whether there is remained BUs;
scheduling ends if there is no remained BUs, or performing the allocating BUs in an order of sessions having greater normalized SDU drop rate (NDR(i,k)) as many as the number of BUs in order to allocate transmission data in a next session if there is the remained BUs and target session; and
performing the determining whether there is data in buffer in order to calculate an index set of sessions having SDUs that will be dropped if the SDUs are not be transmitted in a slot (k+2) when there is BUs but not target session.

* * * * *